Nov. 27, 1928.
R. BALDWIN
SEED BAG
Filed Nov. 1, 1927
1,693,266
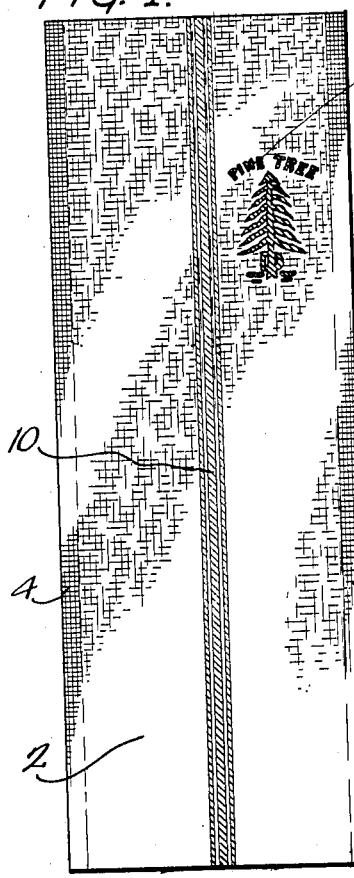
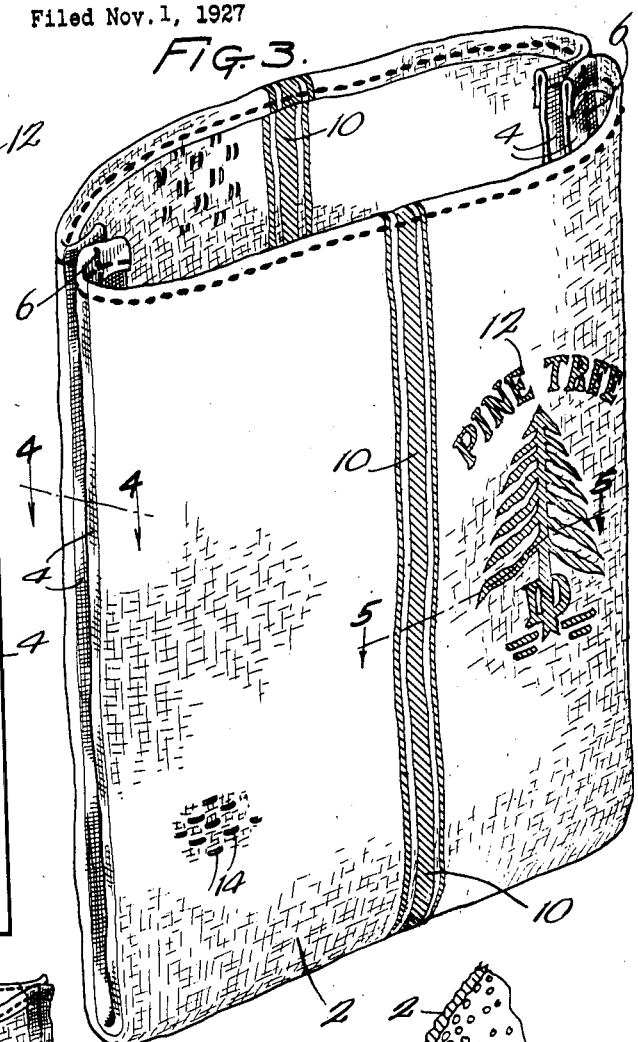
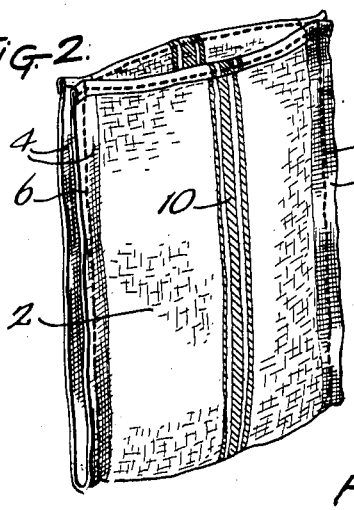
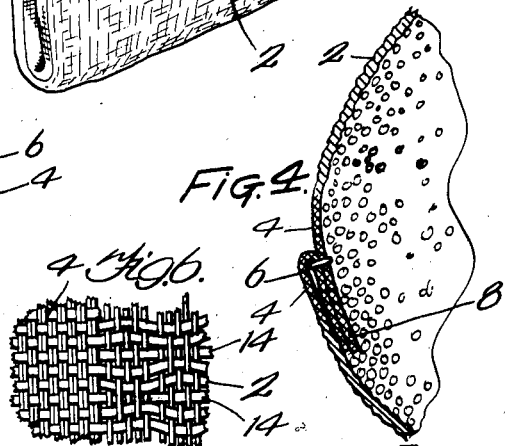
INVENTOR
ROSECRANS BALDWIN
BY Thellwell+Cox ATTYS Patented Nov. 27, 1928.

1,693,266

UNITED STATES PATENT OFFICE.

ROSECRANS BALDWIN, OF CHICAGO, ILLINOIS.

SEED BAG.

Application filed November 1, 1927. Serial No. 230,269.

My invention relates to bags for holding seed for shipping, storage or other purposes.

At the present time farmers and other consumers seriously object to buying seed and paying for the bag, and they either bring a bag with them to hold the seed or else try to force the dealer to furnish the bag for nothing. In certain cases where the farmer pays for the bag he endeavors to return it and get his money back. This is a source of loss to the dealers as their stocks of bags continually accumulate, particularly in territories where there is no need of bags for home-grown seed to be shipped to the wholesale dealer or for other purposes. So also with the present day use of the box truck, it is no longer customary for the farmers to ship their seed in bags. Thus the situation with respect to these seed bags has grown increasingly acute each year until now the dealers are more and more attempting to force the used bags back into the hands of the seed distributors, and in many States the dealers are carrying large stocks of these used bags which depreciate in value from thirty to fifty per cent as soon as they are once used. Farmers will not take them and the used bag problem in the seed distribution business is a very serious matter.

One of the objects of my present invention is to provide a seed bag which when emptied may be used by the consumer as a towel whereby eliminating the objectionable features of the present day bags which are practically useless to the consumers and present a serious problem to the seed distributor due to the fact that the consumers do not have any use for them.

Another object of my invention resides in providing a seed bag of textile material which has the inherent and necessary characteristics of strength in order that the seed shall carry safely to destination; second, sufficient closeness of weave so that the seed cannot pass through the weave in the fabric; third, the fabric must have a fairly smooth inner surface so that seeds (which are sometimes relatively small) will not stick to the nap and hence cause some consequent loss; fourth, the material of which the bag is made is of such a nature that it may be used as a towel; fifth, that this toweling material must be provided with closely woven portions through which a seam or line of sewing may pass to form the bag, while at the same time preventing the bag from pulling out at the seams, to keep the seed from passing through seams at such point and permitting the flap formed by the seam to lie flat so as to prevent any possible escape of the seed through the seam.

These and other objects of my invention will be apparent from a perusal of the following specification when taken in connection with the accompanying drawings wherein—

Fig. 1 is a perspective view of a piece of my especially constructed toweling material before being made up into my improved bag;

Fig. 2 is a perspective view of the bag with the longitudinal edges seamed and before the bag is turned inside out;

Fig. 3 is a perspective of the completed bag when turned inside out;

Fig. 4 is a section on line 4—4 of Fig. 3;

Fig. 5 is a section on line 5—5 of Fig. 3;

Fig. 6 is an enlarged or exaggerated view of the preferred weave of material to be used and which is commonly known as the huck weave.

Referring now to the drawings in detail, my improved seed bag is formed of a piece of preformed toweling material having a woven fabric surface 2 of relatively loose weave but sufficiently close to prevent the small seeds, such as clover seed and the like, from passing through the meshes of the weave. In the present instance I prefer to use a type of huck weave for this portion 2 which contains approximately 48 threads in the warp and 28 threads in the filling, the warp threads being double twisted to give double strength. The preferred construction or nature of this huck weave is shown in an exaggerated form in Fig. 6 of the drawings. This particular weave is selected as the preferred embodiment of my invention because it is peculiarly desirable for carrying out my invention in the formation of a seed bag; first, because it possesses the sufficient or required strength to carry the seed safely to destination in shipment or in storage; second, because the fabric and particularly the inner face of the fabric has a fairly smooth surface so that the seeds, which are very small in some instances, like clover seed, alsike, timothy and red top, which latter type of seed contains approximately 5,000,000 to the pound, will not stick in the nap and therefore will not accumulate within the bag when being emptied; third, the nature of the weave provides the necessary rough or absorptive surface which is requisite for use as a towel so that the empty or unused bag has the actual value to the consumer.

Furthermore the use of loosely woven toweling material for the formation of my improved seed bag is particularly advantageous owing to the fact that seed bags should be constructed of material which will allow of ready access to the contents by the Government and State seed inspectors without the necessity of opening the bag at the top or sides. In the utilization of my improved loosely woven toweling material, this is readily made possible. As is well known, the inspection of the seeds by the Government inspectors is accomplished by the use of an instrument called a seed tryer which comprises a tapering hollow sharp pointed instrument, the point of which being rather small may be inserted between the threads of the loosely woven bag and since the inner end of the instrument is hollow the seeds can flow through the hollow instrument into a receptacle outside of the bag. It is obvious that the use of a seed tryer on a tightly woven fabric such as ordinary sheeting, drill and the like will result in a hole being torn in the bag and the consequent leakage of the seed therethrough whereas my loosely woven toweling material permits the threads to be pushed aside by the rather pointed end of the instrument sufficiently to form the opening for the insertion of the instrument and the withdrawal of seeds therefrom. After the instrument has been withdrawn, these pushed back threads are then re-arranged so that no hole is made in the bag.

By reference to Figures 3 and 6 of the drawing, it will be seen that the particular type of weave of toweling material from which I form my improved seed bag is best suited for such adaptation due to the manner in which the threads overlap each other in forming the relatively loose weave of the portion 2. For instance, refer particularly to Figure 6 which shows at the right side of the figure arrangement of the threads when viewed from the interior face of the bag wherein the vertical threads straddle or overlap three of the horizontal threads so as to cause them to bunch together at this point, thereby making a loose net mesh or weave and providing interiorly located pockets in the mesh for receiving, absorbing or holding moisture or water as in drying the face or hands with the towel. In addition, by exposing the threads in this loosely woven fashion, more of the thread surface is exposed so that there will be a greater absorptive action when used as a towel. It will be also noticed that the horizontal thread, such as thread Number 14 of Figure 6 straddles five of the vertical threads and it will be seen that due to the fact that the vertical threads overlap on the inside and the horizontal threads overlap on the outside of the bag as clearly shown in Figure 3 and also in Figure 6, that the small seeds will not tend to become lodged under the vertically disposed loops, whereas they might if the threads 14 which are horizontally disposed loops, were disposed on the inside and this arrangement is particularly effected during the emptying of the bag, for in such instance, as the seed is poured out it will tend to flow in directions parallel to the vertically disposed loops on the inner face of the bag or as shown in the upper portion 3 of the drawing. This is an important feature because if the bag were constructed on the inner face thereof with looped portions arranged so that the seeds would lodge underneath the same, there would be a relatively large accumulation or adherence of these small seeds within the bag which would make it objectionable for use as a seed bag. However, since a relatively loose weave is necessary for toweling and since relatively loose weaves may possibly involve the presence of relatively long or looped threads in the woven fabric, I have adopted a type of fabric wherein these looped threads extend in the opposite direction so that the seeds will not tend to lodge beneath them, and this direction is parallel to the length of the bag.

The toweling material is provided along its longitudinal edges with a selvage 4 of plain weave which contrasts with the huck weave of the body of the cloth. Unlike ordinary toweling material, this selvage is made unusually wide, being approximately eight times the width of the usual selvage of standard loosely woven toweling material and being also of tighter weave.

In the present invention I propose to form this selvage portion 4 approximately one inch in width. This relatively wide selvage is important since when the toweling shown in Fig. 1 is sewed through the selvage as shown in Fig. 2, the seam 6 may lie practically intermediate the width of the relatively tightly woven selvage and therefore the sides of the bag will be formed in such a manner as to make a practically leakproof seam along the edges of the bag so that the relatively minute seeds cannot escape therethrough. It must be seen that the line of stitching is located so that there is always a selvage portion between the line of stitching and the adjacent loosely woven portion of the bag whereby when the bag is full of seeds and is thrown about during handling, the resultant pressure will cause the line of stitches to pull directly upon the tightly woven selvage and not upon the individual threads of the bag. Experience has shown that when the pull is on the individual threads of the loosely woven portion relatively large openings are made through which the seeds leak.

In addition by providing a much wider selvage, two relatively long flaps within the bag are formed when the bag is turned inside out as shown in Figs. 3 and 4, which relatively long ends 8 are passed tightly when the bag is filling or full, against the side of the bag to form a sort of flap seal, thus closing tightly together these two flaps so that seed cannot enter therebetween and tend to escape through the line of stitching 6. Due to the relatively tight weave of the selvage, the stitching 6 will form a desirable seam on the selvage whereas it would not through the body 2 of the huck weave.

It will be appreciated that when the bag is full the weight of the seed amounts to approximately sixty pounds and this weight, if the seam were not formed of relatively strong threads through the tighter woven wide selvaging, would tend to pull the seams out and the seed would leak through the openings. In addition this wide selvaging gives abundant room for the sewing. The machine operatives of the bag manufacturers who sew the side seams of the bag have sufficient margin so that these seams will not run into the relatively loose huck weave of the fabric itself. If a narrow selvaging is used, the operatives in making the bags, would sew into the huck weave portion of the bag which would produce a defective bag.

As an additional ornamental feature of my present type of bag, I prefer to weave an ornamental and highly colored band or stripe 10 longitudinally through the huck weave 2 of the bag, and if desired the name of the bag manufacturer may be woven at intervals into and through this stripe 10.

In addition I prefer to print or stamp in any desirable colored ink the name or trademark 12, if desired, on the body 2 of the huck toweling, which name or brand on the bag will wash and bleach out easily, leaving only the attractive colored stripe woven through the bag and running down the center thereof.

It will be apparent that after seeding time or after the bag has become emptied it may be washed out and the side seams 6 ripped out, the bag may be cut across the bottom and the sides and the ends hemmed, which will produce two fine hand towels worth at least from twenty-five to thirty-five cents apiece, thus producing two towels from every bag each measuring approximately 27 inches long and 17 inches wide where a one bushel bag is made. Or, alternatively, the side seams 6 may be ripped out and the bag sewn across the top so as to provide a roller towel.

It will thus be seen that by the use of a relatively wide selvage, I am enabled to provide sufficient seam portions so that the line of stitching will be located sufficiently spaced away from the loosely woven portion of the bag so that when the bag has been used and is emptied and the seams ripped for forming into toweling material, the selvage and the adjacent loosely woven portion of the toweling material will be un-injured, that is, there will be no holes formed in the loosely woven portion due to rough handling when the bag is full.

It will be apparent that the advantages of my improved seed bag are so great and numerous that the present type of bag is being readily sought by farmers and other consumers of seed. My present type of bag permits the sale of seed in a smaller package than the old standard package which held two and a half bushels, since the present type of bag holds one bushel, thereby enabling the farmer to buy his seed in one bushel lots, which is the standard amount.

In addition by providing a seed bag of toweling material and in the manner disclosed herein, the original distributor of the seeds packing them into bags of standard one bushel size is assured that the same quality of seeds reaches the ultimate consumer in the original package without danger of adulteration or substitution; since the consumer or farmer desires the bag he therefore will not suffer the seeds to be emptied therefrom.

In addition my improved bag enables the dealer to sell the bag to the farmers by explaining the reclaimed value of the bag itself and its use as a towel in the farm home, whereby the reclaimed value of the bag is approximately double the original cost of the bag.

My improved bag also enables the farmer so that instead of being obliged to buy bags in which to carry his seed home, he actually gets a bag which after opening and emptying the seeds may be thoroughly washed, bleached and ironed and made into a roller towel or, by cutting in two and hemming, will furnish two standard size face towels.

In addition my improved bag entirely eliminates the heretofore objectionable used bag losses known in the trade. It does away with all arguments with farmer customers and turns these seed bags from a liability into a positive asset both to the seed dealer and to the farmer, and in addition is a valuable aid in the farm home for selling the products of the seed distributor.

Having thus described my invention what I claim as new and desire to secure by Letters Patent is:—

1. A textile fabric seed bag formed of loosely woven toweling material, the material along the sides of the bag being provided with a selvage border approximately one inch in width and having a line of stitching therethrough forming the bag seam.

2. A textile fabric seed bag consisting of loosely woven toweling provided with selvage borders of much greater width than the selvage of standard loosely woven toweling material and a line of stitching passing substantially through the middle of the selvage longitudinally of the bag to provide relatively wide selvage flaps adapted to seal the line of stitching when the bag is full of seeds.

3. A seed bag for holding fine seeds formed of relatively loose weave due to certain of the threads of the weave overlying a plurality of other threads of the weave, the overlying threads on the inner face of the bag being arranged only in the direction of the longitudinal axis of the bag whereby to prevent a lodging of the relatively small seeds in such overlying threads when the bag is emptied.

4. A seed bag for holding and shipping fine seeds formed of relatively loosely woven toweling material having a marginal selvage of tighter weave and of sufficient width to provide seam portions, and a line of stitching passing through said selvage and providing a selvage portion between the line of stitching and the adjacent loosely woven body whereby the pull of the stitching under storage and handling conditions when the bag is full is exerted upon the tightly woven selvage thereby to prevent pulling individual threads of the loosely woven body portion and the consequent formation of holes in the loosely woven body portion and resulting seed leakage.

5. A seed bag for holding and shipping fine seeds formed of relatively loosely woven absorptive toweling material having a marginal selvage of pronounced tightness of weave and of unusual width to provide sufficiently wide and strong seam carrying portions, and stitching forming a seam of the bag passing through said seam portions in a manner to provide the selvage portion between the stitching and the adjacent loosely woven body whereby the pull of the stitching under storage and handling conditions when the bag is full is exerted upon the selvage thereby to prevent pulling individual threads of the loosely woven body portion and the consequent formation of holes in such loosely woven body portion and resulting seed leakage.

6. A seed bag composed of relatively loosely woven toweling for holding relatively fine seeds, said toweling having selvage margins of greater width and tightness of weave than the selvage of standard huck toweling material, said selvage portions being inturned and stitched together so as to leave a selvage interval between the stitching and the loosely woven portion of the bag.

7. A textile fabric seed bag for holding fine seeds composed of relatively loosely woven toweling material having selvage portions stitched to form the side seams of the bag, said selvage portions being approximately one inch in width and woven tighter than the selvage of standard loosely woven toweling material and said line of stitching being arranged so as to provide selvage portions between the stitching and the adjacent loosely woven portion of the bag.

In witness whereof, I have hereunto subscribed my name.

ROSECRANS BALDWIN.